US011962154B2

(12) United States Patent
Ger

(10) Patent No.: US 11,962,154 B2
(45) Date of Patent: Apr. 16, 2024

(54) ELECTRIC POWER DISPATCHING SYSTEM AND ELECTRIC POWER DISPATCHING METHOD

(71) Applicant: Chih-Chan Ger, New Taipei (TW)

(72) Inventor: Chih-Chan Ger, New Taipei (TW)

(*) Notice: Subject to any disclaimer, the term of this patent is extended or adjusted under 35 U.S.C. 154(b) by 404 days.

(21) Appl. No.: 17/477,673

(22) Filed: Sep. 17, 2021

(65) Prior Publication Data

US 2022/0094165 A1 Mar. 24, 2022

(30) Foreign Application Priority Data

Sep. 24, 2020 (CN) .......................... 202011015793.6

(51) Int. Cl.
*B60L 50/00* (2019.01)
*B60L 53/80* (2019.01)
*B60L 55/00* (2019.01)
*H02J 3/32* (2006.01)

(52) U.S. Cl.
CPC .............. *H02J 3/322* (2020.01); *B60L 53/80* (2019.02); *B60L 55/00* (2019.02)

(58) Field of Classification Search
CPC ... H02J 3/322; H02J 3/32; B60L 53/80; B60L 55/00; Y02T 10/70
See application file for complete search history.

(56) References Cited

U.S. PATENT DOCUMENTS

| 6,487,096 | B1* | 11/2002 | Gilbreth | H02J 1/14 |
| | | | | 363/35 |
| 8,855,829 | B2* | 10/2014 | Golden | G05F 1/66 |
| | | | | 700/291 |
| 10,554,117 | B2* | 2/2020 | Bou-Saada | H02M 7/797 |
| 10,965,129 | B2* | 3/2021 | Baek | H02J 9/062 |
| 2008/0281663 | A1* | 11/2008 | Hakim | H02J 3/466 |
| | | | | 705/7.25 |
| 2011/0202192 | A1* | 8/2011 | Kempton | G06Q 30/0601 |
| | | | | 320/109 |
| 2018/0126775 | A1* | 5/2018 | Canton | B29C 66/45 |
| 2018/0339595 | A1* | 11/2018 | Chang | B60L 55/00 |

(Continued)

FOREIGN PATENT DOCUMENTS

WO WO-2018102965 A1 * 6/2018 .......... B25J 19/0079

*Primary Examiner* — Jason D Shanske
*Assistant Examiner* — James J Triggs
(74) *Attorney, Agent, or Firm* — McClure, Qualey & Rodack, LLP

(57) ABSTRACT

The present invention provides an electric power dispatching system and an electric power dispatching method. The electric power dispatching system has a plurality of accommodating spaces, a DC bus, an AC/DC power conversion device, and an energy control center. The swappable battery pack in each accommodating space is coupled to the DC bus, and the AC/DC power conversion device is coupled between the DC bus and a power grid. The electric power dispatching method includes centrally storing a plurality of swappable battery packs from different electric vehicles; and controlling the AC/DC power conversion device and each swappable battery pack located in each accommodating space by an energy control center to designate a part of the swappable battery packs located in the accommodating spaces to participate in a first power dispatch task so as to provide power dispatch to the power grid.

17 Claims, 9 Drawing Sheets

(56) References Cited

U.S. PATENT DOCUMENTS

2019/0385182 A1* 12/2019 Price ............... G06Q 50/06
2021/0331601 A1* 10/2021 Yang ............... B60L 58/10
2022/0094165 A1*  3/2022 Ger ................ H02J 3/322

* cited by examiner

ELECTRIC POWER DISPATCHING SYSTEM AND ELECTRIC POWER DISPATCHING METHOD

CROSS REFERENCE TO RELATED APPLICATIONS

This Non-provisional application claims priority under 35 U.S.C. § 119(a) on Patent Application No. 202011015793.6 filed in People's Republic of China on Sep. 24, 2020, the entire contents of which are hereby incorporated by reference.

BACKGROUND OF THE INVENTION

Field of the Invention

The invention relates to an electric power system and its operation method, in particular to an electric power dispatching system and the electric power dispatching method.

Descriptions of the Related Art

Electric energy is one of the most dense, widely distributed and most used energy types in the world due to its convenient use. When the power supply and demand imbalance, the most serious situation may cause the power grid to collapse. Therefore, the power supplied and demand balance must be maintained at all times so as to maintain the stability of the power grid. Adjusting the power supplied of the power grid in a timely manner in response to the demand of the power load is the so-called power dispatch.

In general, electricity can be obtained through thermal, hydraulic or nuclear. Among them, nuclear electricity generation or thermal electric generation generally supplies the basic power demand, and when there is an unexpected emergency power demand, it will choose to increase the hydraulic power generation. This is because the hydraulic power generation has the characteristics of fast start-up, and it can quickly operate in parallel to provide the power required by the power grid. However, the disadvantage of hydraulic power generation is the water used will be gone, a pumped storage hydropower has the ability to recycle the water, but a huge storage tank must be built because the water used for power generation must be pumped to the storage tank for storage during the off-peak period of the power grid. Therefore, the pumped storage hydraulic power generation is limited by natural factors such as limited construction environment and rainfall.

In recent years, the green energy power generation technologies such as solar power generation and wind power generation that the industry has promoted are more restricted by the external environment (such as the strength of sunlight or wind power), and its power generation is difficult to control so that the power grid is difficult to maintain, and the cost of power dispatch is increased.

Compared with conventional power generation systems (i.e., thermal electric generation and hydraulic power generation . . . etc.), the inertia of the green energy power generation system is smaller. When the normal power generation or the loading changes, the frequency of the power generation system is likely to deviate from the target value. When a trip accident occurs in the power generation system, the lower inertia of the green energy power generation system leads to higher frequency deviation, which is more likely to cause system collapse. It is also highlights the difficulty of power dispatching in the power grid with the higher green energy power generation system.

Battery energy storage power generation has more rapid response characteristics. Therefore, in order to solve the problem of peak or instant power shortage, the industry uses battery energy storage power generation to replace hydraulic power generation, which has become a better scheduling solution for low inertia green energy power generation. But the cost of battery energy storage power generation is quite expensive, which includes at least the power generation cost of the power grid, battery depreciation cost and re-generation cost. The current average cost of lithium batteries for energy storage is about US$180 to US$200 per kilowatt hour, which is much more expensive than other energy storage power plants. Therefore, the cost of building a cost-effective battery energy storage power plant alone is very considerable.

Therefore, it is an import subject matter to respond to the demand of the power grid, dispatch power more cost-effectively and maintain the stability of the power system.

SUMMARY OF THE INVENTION

In view of the foregoing, the invention is to provide an electric power dispatching system and an electric power dispatching method, which utilize a single power dispatching station to perform load shifting of the power grid, battery energy storage power generation and battery pack swap to achieve flexibly power dispatch, and dispatch power more economically and effectively in response to the demand of the power grid and maintain the stability of the power system.

To achieve the above, the invention provides an electric power dispatching method applied to a power dispatching station. The power dispatching station has a plurality of accommodating spaces, a DC bus, and an AC/DC power conversion device. The accommodating spaces is utilized to accommodate a swappable battery pack. Each accommodating space corresponds to a connector, which is coupled to the DC bus, and the AC/DC power conversion device is coupled between the DC bus and a power grid. The electric power dispatching method includes at least the following steps 1 and 2.

Step 1 is to centrally store a plurality of swappable battery packs, which is unloaded from different electric vehicles, in the corresponding accommodating space, and the connector corresponding to the accommodating space is electrically connected to the swappable battery pack stored in the accommodating space. Step 2 is to control the AC/DC power conversion device and each swappable battery pack located in each accommodating space by an energy control center to designate a part of the swappable battery packs located in the accommodating spaces to participate in a first power dispatch task. Among them, the first power dispatch task may include providing power to the power grid through the DC bus and the AC/DC power conversion device by discharge the designated swappable battery packs, additionally, the first power dispatch task may include using power from the power grid through the DC bus and the AC/DC power conversion device by charging the designated swappable battery pack. Moreover, one of the designated swappable battery packs was charged at another power dispatching station.

In one embodiment, part of the swappable battery packs that did not participate in the first power dispatch task are charged through the DC bus during the execution of the first power dispatch task.

In one embodiment, the energy control center further executes a second power dispatch task to designate the swappable battery packs different from the first power dispatch task to participate in the second power dispatch task or designate part of the swappable battery pack that did not participate in the first power dispatch task to participate in the second power dispatch task.

In one embodiment, the energy control center further executes a second power dispatch task, in which part of the swappable battery packs participate in the first power dispatch task and the second power dispatch task is located in the different accommodating spaces.

In one embodiment, the number of the swappable battery packs joining with the first power dispatch task is changed during the first power dispatch task. In other words, the number of swappable battery packs joining with the first power dispatch task may be increased or decreased.

In one embodiment, the first power dispatch task includes a first power generation dispatch task and a first power consumption dispatch task. Among them, the first power generation dispatch task includes providing power to the power grid through the DC bus and the AC/DC power conversion device by the swappable battery pack (that is, the swappable battery pack discharges to the DC bus). In addition, the first power consumption dispatch task includes using the power of the power grid to charge part of the swappable battery pack through the DC bus and the AC/DC power conversion device (that is, the swappable battery pack is charged from the DC bus). Furthermore, at least one of the swappable battery packs may be charged from the DC bus and at least one of the swappable battery packs may discharge to the DC bus at the same time.

In one embodiment, the total current flowing from the swappable battery packs to the DC bus is increased during the first power generation dispatch task.

In one embodiment, the total current flowing from the DC bus to the swappable battery packs is increased during the first power consumption dispatch task.

In one embodiment, the energy control center controls the voltage of the DC bus within a predetermined range.

In one embodiment, part of the swappable battery packs that participating in the first power dispatch task is charged and then loaded into an electric vehicle to charge a main battery pack of the electric vehicle.

In one embodiment, part of the swappable battery packs that participated in the first power dispatch task also participated in a power dispatch task of another power dispatching station.

In one embodiment, during the first power dispatch task, part of the swappable battery pack can be designated to exit the first power dispatch task, while another part of the swappable battery pack can be designated to participate in the first power dispatch task.

In one embodiment, the energy control center also receives a second power demand instruction and executes a second power dispatch task. Among them, the second power demand instruction is the same as the first power demand instruction, but part of the swappable battery pack that participates in the second power dispatch task has not participated in the first power dispatch task. It should be noted that the so-called "same power demand command" is, for example, that the power grid requires the same power or the same amount of power generation time.

In addition, in order to achieve the above objective, the present invention also provides an electric power dispatching system, which is used in conjunction with a power dispatching station. The power dispatching station centrally stores a plurality of swappable battery packs unloaded by different models of electric vehicles. The swappable battery packs are exchanged by a exchanging device through loading or unloading operations. Each swappable battery pack has a DC power converter and a plurality of the battery cells, which are electrically connected to each other. Part of the swappable battery packs can have the same appearance and different capacities. The electric power dispatching system includes a plurality of accommodating spaces, an AC/DC power conversion device, and an energy control center. Each accommodating space is provided with a corresponding connector, which is used to connect with the corresponding swappable battery pack, and the connector is also coupled to a DC bus. The AC/DC power conversion device is coupled between the DC bus and a power grid. The energy control center controls the AC/DC power conversion device and the swappable battery pack located in each accommodating space in accordance with a first power demand instruction to designate a part of the swappable battery pack located in the accommodating space to participate in the first power dispatch task. The power dispatch task system includes a power generation dispatch task and a power consumption dispatch task. Among them, the power generation dispatch task includes providing power to the power grid through the DC bus and the AC/DC power conversion device by the designated swappable battery pack. It is to be noted, at least one of the designated swappable battery packs has been charged at another power dispatching station.

In one embodiment, part of the swappable battery packs that did not participate in the first power dispatch task are charged through the DC bus during the execution of the first power dispatch task by the electric power dispatching system.

In one embodiment, the energy control center keeps the voltage of the DC bus within a predetermined range through the DC power converter within the swappable battery pack and the AC/DC power conversion device.

In one embodiment, the swappable battery pack participating in the first power dispatch task has different capacities.

In one embodiment, the AC/DC power conversion device includes a plurality of power conversion units. Wherein, the power conversion units are selected from a DC to AC conversion unit, an AC to DC conversion unit, and combinations thereof.

In one embodiment, the DC power converter of the swappable battery pack is a non-isolated DC power converter.

In one embodiment, the DC power converter of the swappable battery pack is a bidirectional DC power converter.

In one embodiment, the AC/DC power conversion device is connected to the power grid through a transformer.

In one embodiment, the voltage of the DC bus is higher than the voltage of the battery cells inside the swappable battery pack.

As mentioned above, the present invention utilizes one electric vehicle, which can be installed with the swappable battery pack and the main battery pack, to separate the swappable battery pack from one power dispatching station, and then concentrate it on another power dispatching station. The swappable battery pack is commonly used between the power dispatching station and electric vehicles, so the power dispatching station can perform three functions including battery swapping of electric vehicles, the load shifting of the power grid, and the battery energy storage power generation. The electric power dispatching method and the electric power dispatching system also share the management cost together to achieve loop-like operation, flexible power dispatch and cost reduction. The following is a brief description of the main technical features of the present invention.

Regarding the connection link between the DC bus and the swappable battery pack, it can be a fixed structure, or a non-fixed structure composed of components such as relays. The so-called non-fixed structure is, for example, a connection relationship formed by switching the relay through a control signal.

Regarding the use of the shared swappable battery pack as the battery swapping of electric vehicles, the implementation method is that the swappable battery pack unloaded by electric vehicles of different specifications or models, which are charged at the power dispatching station and then loaded into the accommodating space of the different electric vehicles and charge the main battery pack with different specifications or different models of the different electric vehicle. Among them, the accommodating space of different electric vehicles means that the accommodating space is designed to adapt to the same exterior specification, and the swappable battery pack that meets the exterior specification can be accommodated. It does not mean that the size of all accommodating spaces is the same. In the same way, the accommodating space of the power dispatching station also applies to the above definition.

In the same way, the same appearance of the swappable battery pack does not mean that its size is unique, but it means that it must adapt to the same appearance specification during design to ensure compatibility with the accommodating space. An example of compatibility, take the AAA battery as an example. The dimensions of AAA batteries manufactured by different manufacturers are not exactly the same that may be caused by design or manufacturing tolerance, and the size or connection method of the accommodating space of the AAA battery of different devices is not exactly the same. However, because the design adapts to the same appearance specification, there is compatibility in use without problems.

Regarding the centralized use of the swappable battery pack to achieve the load shifting of the power grid and the implementation of the battery energy storage power generation system, the implementation methods include unloading the swappable battery pack from electric vehicles with different specifications or models, and centrally storing the swappable battery pack on the power dispatching station. In these unloaded swappable battery packs, they can have different capacities, but they can all be placed in the same accommodating space to connect to the DC bus for providing or using the power from power grid through the AC/DC power conversion device. In practice, to be able to perform battery pack swap operations smoothly, there must be sufficient battery pack inventories, sufficient storage space, dedicated exchanging devices, and proper charging devices and management facilities. To be able to perform the load shifting of the power grid and battery energy storage power generation, there must be sufficient power generation capacity (battery pack inventory), storage space, charging devices, power generation devices, and management facilities to update the real-time backup capacity at any time.

Regarding power dispatching, it utilizes electric vehicles with both the swappable battery pack and the main battery pack to move freely between power dispatching stations in cities and highways, and the swappable battery pack is used for each power dispatching station through electric vehicles. The swappable battery pack separates, concentrates, and accepts charge and discharge scheduling among various power dispatching stations through electric vehicles to achieve flexible power dispatch.

Regarding the term of "designate or designation", it requires multiple specific swappable battery packs to participate in the power dispatch task. If the connection relationship is similar to the above-mentioned non-fixed structure, the designation of the connection relationship is also belonging to the definition of the term of "designate or designation". For example, a first swappable battery pack and a second swappable battery pack are connected to the DC bus through a first relay and a second relay, respectively. Among them, the first relay and the second relay are open circuit in the general state. If the first swappable battery pack is designated to participate in the power dispatch task, the first relay must be designated as a short circuit (or conduction) state.

In addition, the term of "designate or designation" also has a control meaning, which means to specify the control method for the selected the swappable battery pack. For example, when the required power is 10 KW, 10 sets of the swappable battery pack can be selected and set them to 1 KW output. Another setting method is to set 5 of the 10 sets of the swappable battery pack to 1.2 KW, and the other 5 sets of the swappable battery pack to set the output to 0.8 KW. The above two setting methods can achieve the goal of total power output of 10 KW. For another example, when the required power is 20 KW, 20 sets of the swappable battery pack can be selected and set to the output of 1 KW. Another setting method is to set 10 sets of the swappable battery pack and set them to 2 KW output. Both of these two setting methods can achieve a total power output of 20 KW.

Furthermore, the power dispatch task includes the power generation dispatch task and the power consumption dispatch task. Regarding the power generation dispatch task, it means that the power dispatching station executes the task of increasing the available power of the power grid according to the power demand command (equivalent to reducing the power consumption of the power grid of the power dispatching station), which includes the following two methods. The first method is to reduce the amount of electricity used for charging from the power grid in the power dispatching station or called as Grid power peak shaving. The second method is to change the power dispatching station from the role of using electricity to the role of energy storage and power generation, or to increase its power generation from the role of energy storage and power generation, to increase the available power of the power grid. In short, it means that the sum of the current flowing to the DC bus from all the swappable battery packs is increasing.

Regarding the power consumption dispatch task, it means that the power dispatching station executes to increase the power usage of the power grid (equivalent to increasing the power consumption of the power dispatching station) according to the power demand command. The method can include reducing the power generation of the power dispatching station, from energy storage power generation to power consumption, or increased power consumption, which can be called Grid power Valley filling. Among them, the so-called "power consumption" is mainly based on the charging of the battery pack. In other words, the power consumption dispatch task means that the sum of the current flowing from the DC bus to all the swappable battery packs is increased.

The swappable battery pack is composed of the battery cell coupled to a DC power converter. Different swappable battery packs can be composed of the battery cell with different specifications. When the power dispatching station executes the power dispatch task, it not only needs to control the power of the AC/DC power conversion device, but also must control the DC power converter of each swappable battery pack participating in the power dispatch task, therefore, the voltage of the DC bus can be controlled within a predetermined range to ensures that the DC bus operates in the correct and safe range.

The design of the swappable battery pack is based on the main battery pack that is matched at the factory, so that different brands of electric vehicles can take advantage of their inherent characteristics. The specifications and working mode of the DC power converter of different swappable battery packs can be different. Therefore, when the power dispatch task is executed, the DC power converter of each swappable battery pack participating in the power dispatch task must be controlled at the same time.

As the number of electric vehicles becomes larger, the power dispatching station must store a huge amount of the swappable battery pack to meet the demand for replacement of the swappable battery pack for electric vehicles. Therefore, the swappable battery pack owned by the power dispatching station has a total power capacity larger than that of a general battery energy storage power station. For example, suppose the capacity of the swappable battery pack of an electric car is 20 KWh. If there are 10,000 electric cars moving between cities, it means that the total capacity of these swappable battery packs is 200 MWh. When there are enough electric vehicles, the amount and capacity of the swappable battery pack stored in the power dispatching station will be considerable. Compared with the largest battery energy storage power station in 2018, the power station established by Tesla Inc. in Hornsdale, Australia has a battery capacity of 129 MWh. The battery capacity of the power dispatching station will be much larger than that of ordinary energy storage power station.

The battery capacity of a traditional battery energy storage power station is basically fixed, and when the battery is fully charged, it does not need to be recharged before the next power generation task. However, the power dispatching station of the present invention needs to constantly replenish the swappable battery pack that is unloaded from the electric vehicle and needs to be charged. The huge and regular charging demand and the huge battery capacity reserves brought by the flow of electric vehicles can easily achieve the load shifting of the power grid.

Regarding the power demand command, it represents an imbalance between the supply and demand of the power grid. Therefore, when the power dispatch task is the power generation dispatch task, the power dispatching station can increase battery energy storage power generation or reduce the total charge capacity of the swappable battery pack and its combination to increase the usable power of the power grid. In addition, when the power dispatch task is the power consumption dispatch task, the power dispatching station can reduce battery energy storage power generation or increase the total charging capacity of the swappable battery pack and its combination, so that the available power of the power grid is decreasing.

In other words, after the energy control center receives the power demand command, it will designate a part of the swappable battery pack located in the accommodating space to participate in the power dispatch task, and increase or decrease the total charging capacity, the total discharge capacity of the swappable battery pack in the accommodating space to complete the power generation dispatch task and the power consumption dispatch task.

As mentioned above, the electric power dispatching system and the electric power dispatching method of the present invention centrally manage the swappable battery packs used for electric vehicles, and then perform adaptive dispatching on them, to effectively integrate more and more electric vehicles. The swappable battery pack can be supplied to electric vehicles after being charged, and it can also provide grid-connected power generation quickly when the power grid needs backup power. When the power grid has surplus power, the total charge capacity of the battery pack can also be quickly increased to achieve Grid Power Valley Filling. The electric power dispatching system centralizes the swappable battery pack at the power dispatching station to perform the three functions of the battery exchange of electric vehicles, the load shifting of the power grid and the battery energy storage power generation system. The shared swappable battery pack, storage space, charging device and management facilities can reduce fixed and variable costs.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DESCRIPTION OF THE PREFERRED EMBODIMENT

In the following description, this invention will be explained with reference to embodiments thereof. However, the description of these embodiments is only for purposes of illustration rather than limitation.

The terms "first" and "second" used herein do not specifically refer to the order or sequence that only used to distinguish the elements or operations described in the same technical terms and are not used to limit the present invention. As used herein, the term "couple" may include direct or indirect electrical connection, or a communication connection or data connection achieved through communication.

Figure 1:
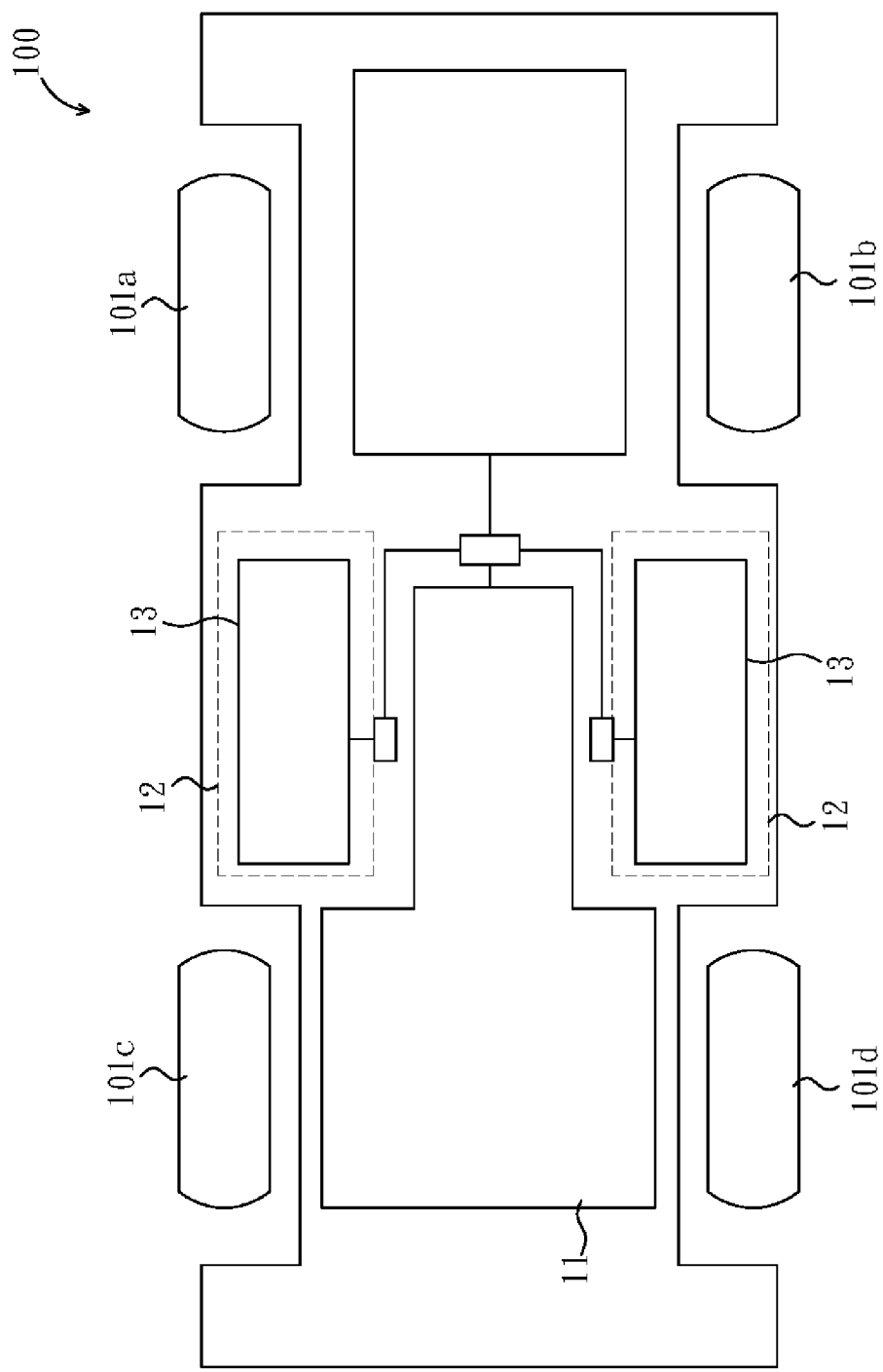
FIG. 1 is a schematic diagram of a battery configuration of an electric vehicle used in conjunction with an electric power dispatching system and an electric power dispatching method of the present invention.

The electric power dispatching system and the electric power dispatching method of the present invention are used in conjunction with electric vehicles and their swappable battery packs. Please refer to FIG. 1, an electric vehicle 100 may include a main battery pack 11, an accommodating space 12, and a swappable battery pack 13.

The main battery pack 11 is arranged in the under-vehicle space between the four wheels 101a to 101d of the electric vehicle 100 and is firmly fixed to the body structure of the electric vehicle 100 (not shown in the figure). However, the actual configuration position of the main battery pack 11 can be changed according to the design of each model.

Figure 2:
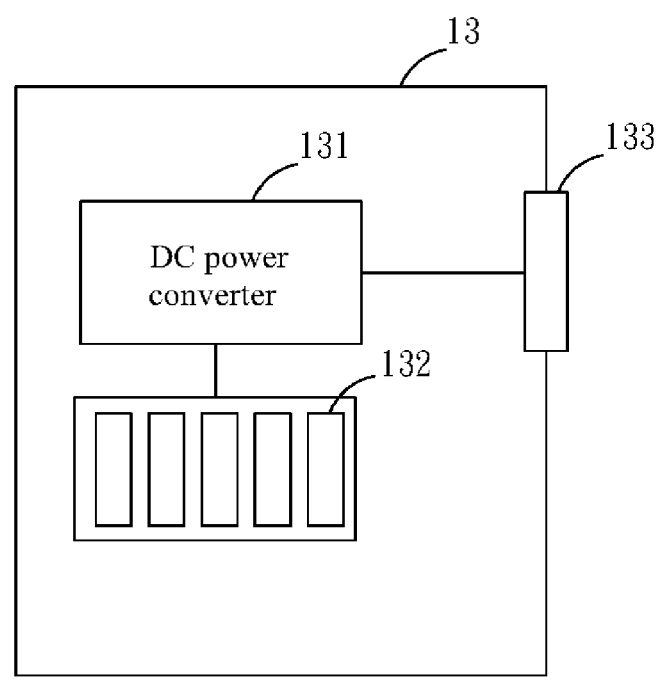
FIG. 2 is a schematic diagram of the structure of a swappable battery pack applied in conjunction with the electric power dispatching system and the electric power dispatching method of the present invention.

The accommodating space 12 can be loaded and connected to the swappable battery pack 13 of different types or capacity specifications. The accommodating space 12 is a semi-enclosed space or enclosed space (not shown in the figure) specially designed for the electric vehicle 100, which can stably accommodate the swappable battery pack 13 of the same shape. As shown in FIG. 2, the swappable battery pack 13 has a DC power converter 131 (or called DC-to-DC converter) and a plurality of battery cells 132, which are electrically connected to each other, and a connection terminal 133. The battery cell 132 may include, but is not limited to, a lithium battery, a lithium cobalt battery, a lithium manganese battery, a lithium nickel battery, a lithium nickel cobalt battery, a lithium iron phosphate battery, and a lithium iron phosphate battery. The DC power converter 131 can be unidirectional type or bidirectional type, and can be isolated type or non-isolated type. It can be independently designed according to the characteristics of the battery cell 132, so that the battery has a longer service life and better power conversion efficiency. In addition, the DC power converter 131 is also electrically connected to the connection terminal 133, whereby the swappable battery pack 13 can transmit power to the outside through the connection terminal 133, or receive power transmitted from the outside.

In the aforementioned electric vehicle 100, the shape of the main battery pack 11 is different from the shape of the swappable battery pack 13, and the different swappable battery packs 13 can have different capacities. In other words, the electric vehicle 100 can be loaded with the swappable battery pack 13 of different capacities at different times, and the swappable battery pack 13 of different capacities can charge the same main battery pack 11 and can also work with the main battery pack 11 to provide the power required for the electric vehicle 100 to travel. In addition, when the power of the electric vehicle 100 is insufficient, the user can choose to use the charging station to charge the main battery pack or the swappable battery pack, or choose to go to the power dispatching station to replace the swappable battery pack 13 in a short time (approximately 3-6 minutes) to replenish the power source required by the electric vehicle 100.

After the number of the above-mentioned electric vehicles 100 and the power dispatching station continue to increase, as the electric vehicles 100 continue to move, there will be a huge number of the swappable battery pack 13 moved between the electric vehicles 100 and the power dispatching station. To further explain, the power dispatching station not only provides the electric vehicle 100 to replace the swappable battery pack 13, but also can charge the swappable battery pack 13 with insufficient power. In addition, the swappable battery pack 13 and the power grid 30 can also be connected to the grid to serve as a power station to fill the emergency situation of the power grid lack of electricity.

Based on the above-mentioned basis, please refer to FIG. 3 again. The electric power dispatching system 20 of the preferred embodiment of the present invention includes a plurality of swappable battery packs 21, a plurality of accommodating spaces 22, an AC/DC power conversion device 23, an energy control center 24 and a DC bus 25. The electric power dispatching system 20 can be configured based on the power dispatching station, and the power dispatching station can be used as the electric vehicle 100 to replace the swappable battery pack 21. The power dispatching station centrally stores multiple swappable battery packs 21 from different electric vehicles 100. These swappable battery packs 21 are circulated between the electric vehicle 100 and other power dispatching station. Therefore, one of the technical features of the present invention includes that the same swappable battery pack 21 can execute the power dispatch task in different power dispatching stations. Of course, the swappable battery pack 21 stored in the power dispatching station is not entirely from the battery pack exchange operation of the electric vehicle, but can also be a retired battery pack.

The swappable battery pack 21 is accommodated in the corresponding accommodating space 22 and is stably accommodated in it. Similar to the aforementioned swappable battery pack 13, the swappable battery pack 21 has a DC power converter 211 and a plurality of battery cells 212 coupled to each other. In addition, each accommodating space 22 is provided with a connector corresponding to the swappable battery pack 21, and the connector is also coupled to the DC bus 25. In the embodiment, the swappable battery packs 21 concentrated in the power dispatching station have different capacities, and the swappable battery packs 21 with different capacities can be randomly set in the corresponding accommodating space 22. In other embodiments, the swappable battery pack 21 with different capacities may be classified and then collectively arranged in the corresponding accommodating space 22. Compared with the conventional battery energy storage power station, each string of batteries all connected to the DC bus adopts the same specifications. One of the technical features of the present invention is the swappable battery pack 21 composed of the battery cells 212 of different specifications that can connect to the DC bus.

Figure 4A:
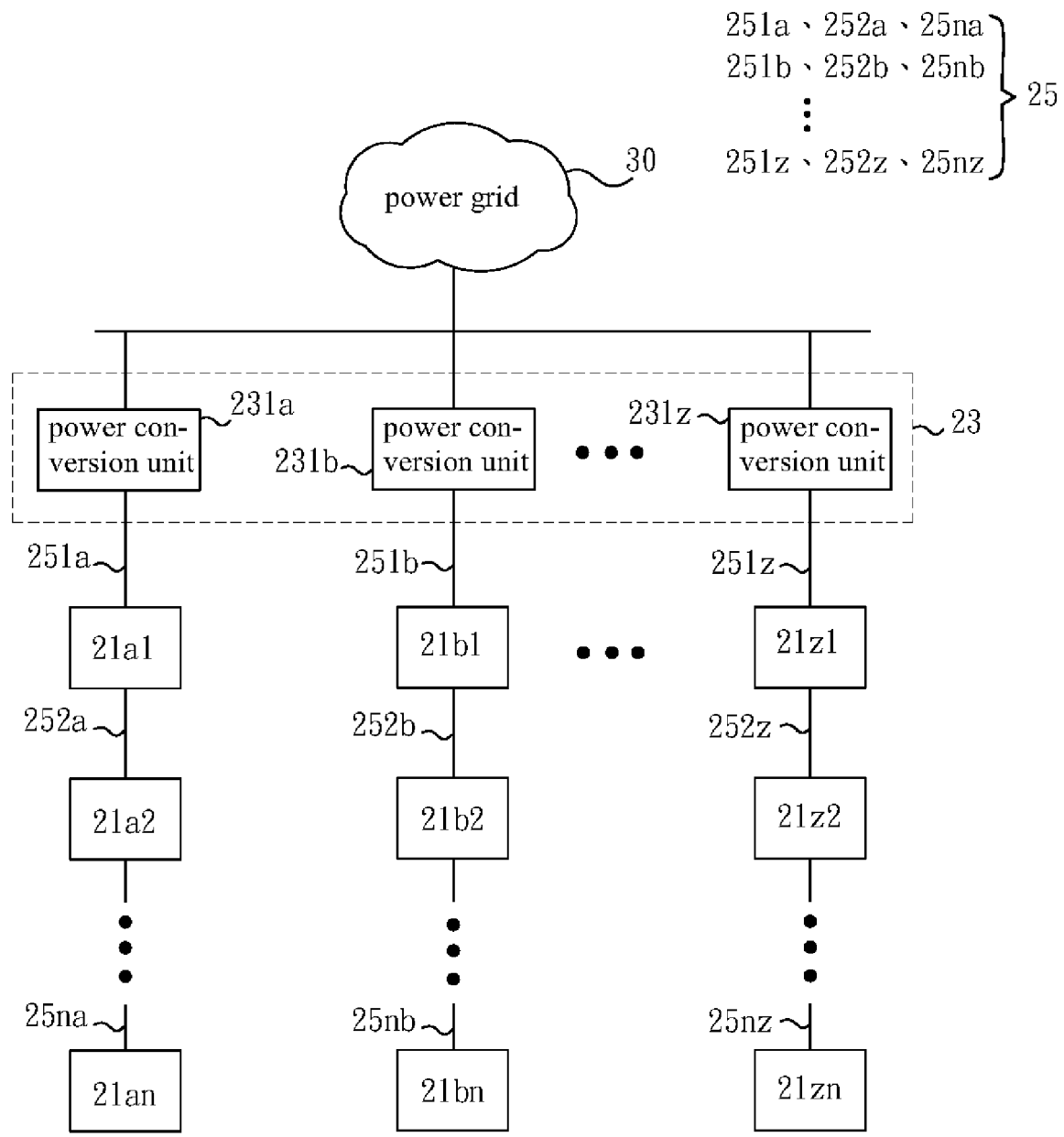
FIGS. 4A and 4B are schematic diagrams of the connection architecture of the AC/DC power conversion device and the swappable battery pack according to a preferred embodiment of the present invention.
Figure 4B:
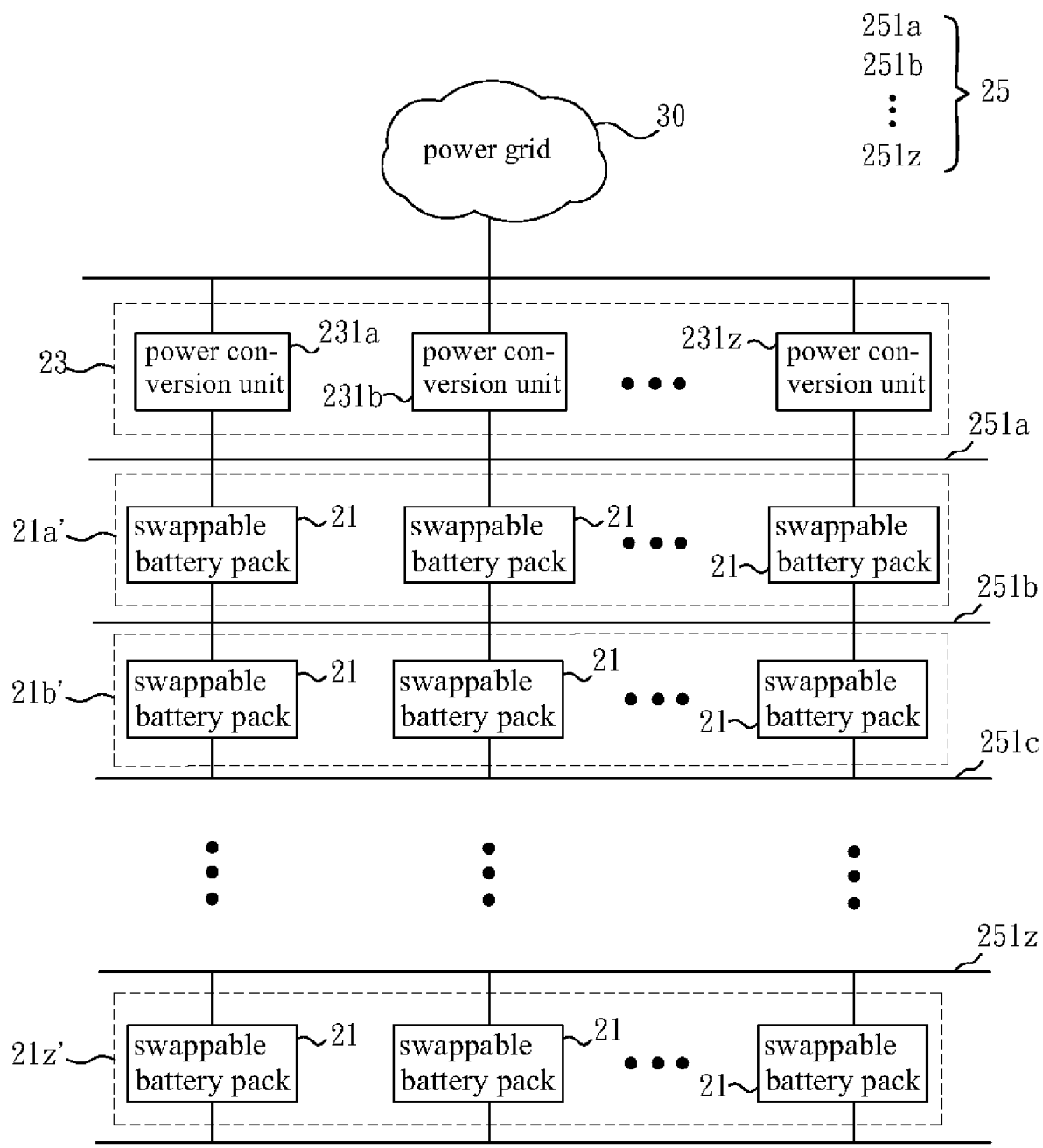

Please refer to FIGS. 4A and 4B, it is to be noted that the accommodating space 22 is set in the power dispatching station, and a plurality of swappable battery packs accommodated in the corresponding accommodating space 22 form a swappable battery pack group 21a1-21an, 21b1-21bn, 21z1-21zn and 21a'-21z'. In addition, the swappable battery pack groups 21a1-21an, 21b1-21bn, 21z1-21zn and 21a'-21z' can be electrically connected in the type of series connection, parallel connection, or both series and parallel connection through proper design.

Figure 3:
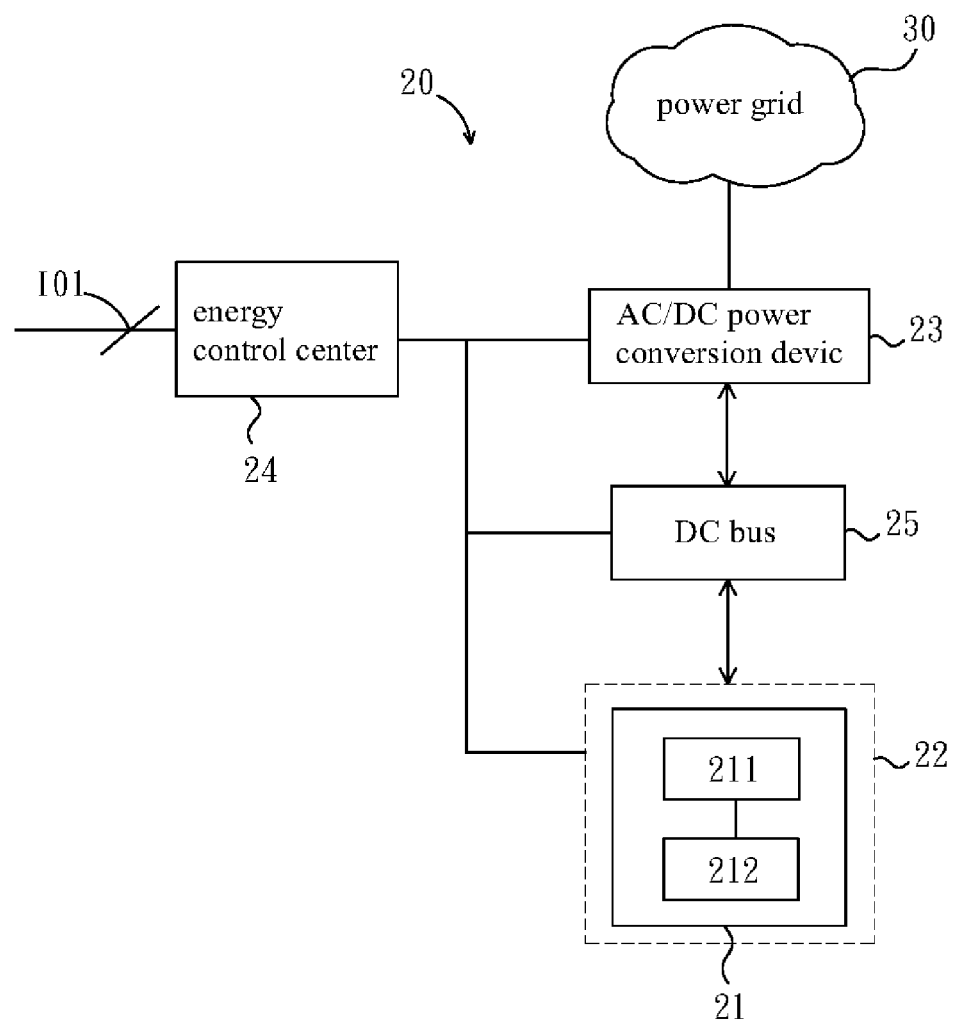
FIG. 3 is a schematic diagram of the structure of the electric power dispatching system according to a preferred embodiment of the present invention.

As shown in FIG. 3, the AC/DC power conversion device 23 is coupled between the DC bus 25 and a power grid 30 for conversion between DC power and AC power. For example, the AC/DC power conversion device 23 converts the DC power transmitted from the swappable battery pack 21 to the DC bus 25 into AC power and then transmits it to the power grid 30. For another example, the AC/DC power conversion device 23 converts the AC power provided by the power grid 30 into DC power, and then transmits it to the DC bus 25 to charge the swappable battery pack 21. The above-mentioned operation mode of transmitting AC power to the power grid 30 can be referred to as grid-connected power generation.

Figure 5A:
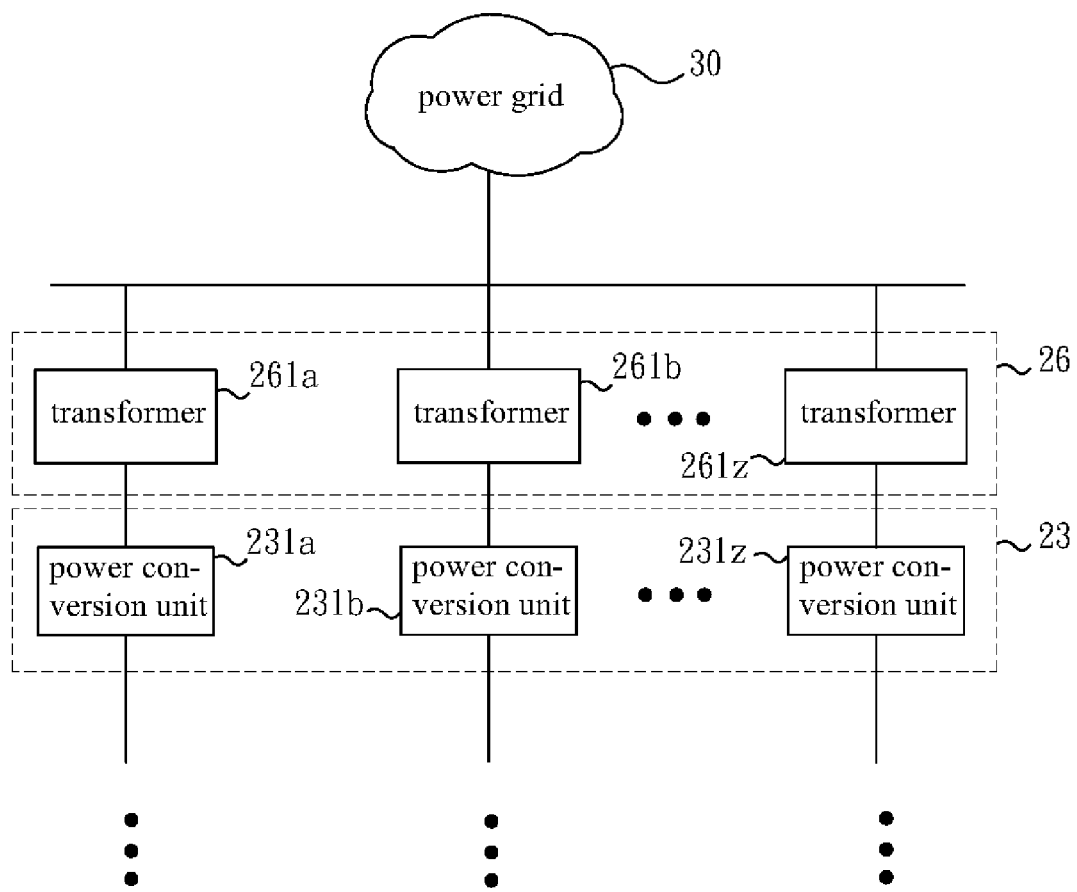
FIGS. 5A and 5B are respectively schematic diagrams of connection of a transformer as a voltage matching in a preferred embodiment of the present invention.

The AC/DC power conversion device 23 may include a plurality of power conversion units 231a-231z (as shown in FIG. 4A), which may include a DC to AC conversion unit, an AC to DC conversion unit, and combinations thereof. Here, the so-called combination means that a single power conversion unit has the function of converting direct current into alternating current (DC-to-AC) and converting alternating current into direct current (AC-to-DC). The forestage of the power conversion units 231a~231z can be directly electrically connected to the power grid 30, or respectively connected to the power grid 30 through a transformer 26, 261a-261z (as shown in FIG. 5A). The post-stage of the power conversion unit 231a-231z is electrically connected to the swappable battery pack 21 in each accommodating space 22 through the DC bus 25 and the connector corresponding to each accommodating space 22.

It is to be noted that the DC bus 25 is a connection interface used to connect the AC/DC power conversion device 23 and the swappable battery pack 21 for power conversion. In general power dispatching, the power of the AC/DC power conversion device 23 is much larger than the power of the DC power converter 211 of the swappable battery pack 21, so in general use, one AC/DC power conversion device 23 being connect to multiple swappable battery packs 21 passes through the DC bus 25. In the embodiment, the DC bus 25 can also include a plurality of sub-buses 251a-251z, 252a-252z and 25na-25nz, which can be connected by multiple series connection, but it is not restrictive, and its purpose is to connect multiple DC buses 25 in series to obtain a higher output voltage to connect the AC/DC power conversion device 23 with higher power.

The energy control center 24 is electrically connected or data connected to the power grid 30, the AC/DC power conversion device 23, the DC bus 25 and the accommodating space 22 to perform control and information collection. The energy control center 24 is electrically connected to the connector corresponding to each accommodating space 22, and then establishes communication with the swappable battery pack 21 accommodated in the accommodating space 22. After the energy control center 24 establishes communication with the swappable battery pack 21, the energy control center 24 can not only obtain the electrical specifications and real-time electrical parameters of the swappable battery pack 21, but also control the operation mode, power supply capacity and charging performance of the swappable battery pack 21.

The connection architecture of the electric power dispatching system 20 between the AC/DC power conversion device 23 and the swappable battery pack 21 can have various types. The following is a brief description of the two connection architectures with two embodiments in FIGS. 4A and 4B respectively. However, the circuit topology can be derived from the two embodiments.

As shown in FIG. 4A, in the first connection structure, the AC/DC power conversion device 23 may include a plurality of power conversion units 231a-231z, which are connected to the power grid 30 respectively. Each power conversion unit 231a-231z is electrically connected to the swappable battery pack group 21a1-21an, 21b1-21bn and 21z1-21zn through the sub-bus 251a-251z, 252a-252z and 25na-25nz of the DC bus 25, respectively. Each swappable battery pack group can be composed of different amounts of the accommodating space 22. The steady-state current of each power conversion unit 231a-231z is equal to the sum of the steady-state current of the swappable battery pack group connected in series. Each swappable battery pack group includes a plurality of the swappable battery pack 21 connected in parallel. Since each swappable battery pack 21 has the DC power converter 211, each DC power converter 211 and the AC/DC power conversion device 23 must be controlled by the energy control center 24 to ensure that the DC bus 25 works in a predetermined voltage range so that the power dispatch task can be successfully completed. In addition, the aforementioned code numbers a, n, and z are merely symbolic representations, rather than representing quantities.

As shown in FIG. 4B, in the second connection architecture, the power conversion unit 231a-231z is connected in parallel between the power grid 30 and the sub-bus 251a-251z of the DC bus 25, and these swappable battery packs 21 can be connected in parallel to form a swappable battery pack group 21a'-21z', and then these swappable battery pack groups 21a'-21z' are connected in parallel to each sub-bus 251a-251z, such as the swappable battery pack group 21a' is electrically connected between the sub-bus 251a and the sub-bus 251b. Among them, the number of the swappable battery packs of each swappable battery pack group 21a'-21z' need not be the same. Since all the swappable battery pack groups 21a'-21z' can be regarded as serial connection, the DC power converter 211 of the swappable battery pack 21 must be controlled to ensure the steady state current of each swappable battery pack group 21a'-21z' are the same. In addition, in the circuit architecture, the number of the power conversion units 231a-231z in operation can be increased or decreased according to the load of the system to maintain the minimum number of the power conversion units 231a-231z in operation to increase the efficiency of the system. In addition, each swappable battery pack 21 has an independent DC power converter 211, it is therefore in the power dispatch task, the swappable battery pack 21 can be added or exited at any time. Compared with the battery cell used in the existing battery energy storage power plant, this feature has a greater scheduling advantage than the restriction that it can only exit but not join in the execution of the power dispatch task.

The number of the power conversion unit 231a-231z in operation can be increased or decreased as the load changes to obtain the maximum conversion efficiency. In addition, the DC bus 25 can also be flexibly designated in parallel connected with a large number of the swappable battery pack group 21a'-21z' to obtain the best power dispatch efficiency. It should be noted that the swappable battery pack group 21a'-21z' mentioned above is for the convenience of description, in actual execution, however, the concept of "group" does not mean the same action of the group, and the swappable battery pack 21 can be controlled or perform operations individually, without being limited to the swappable battery pack 21 in the entire swappable battery pack group 21a'-21z' must perform the same tasks (such as charging or discharging).

Figure 5B:
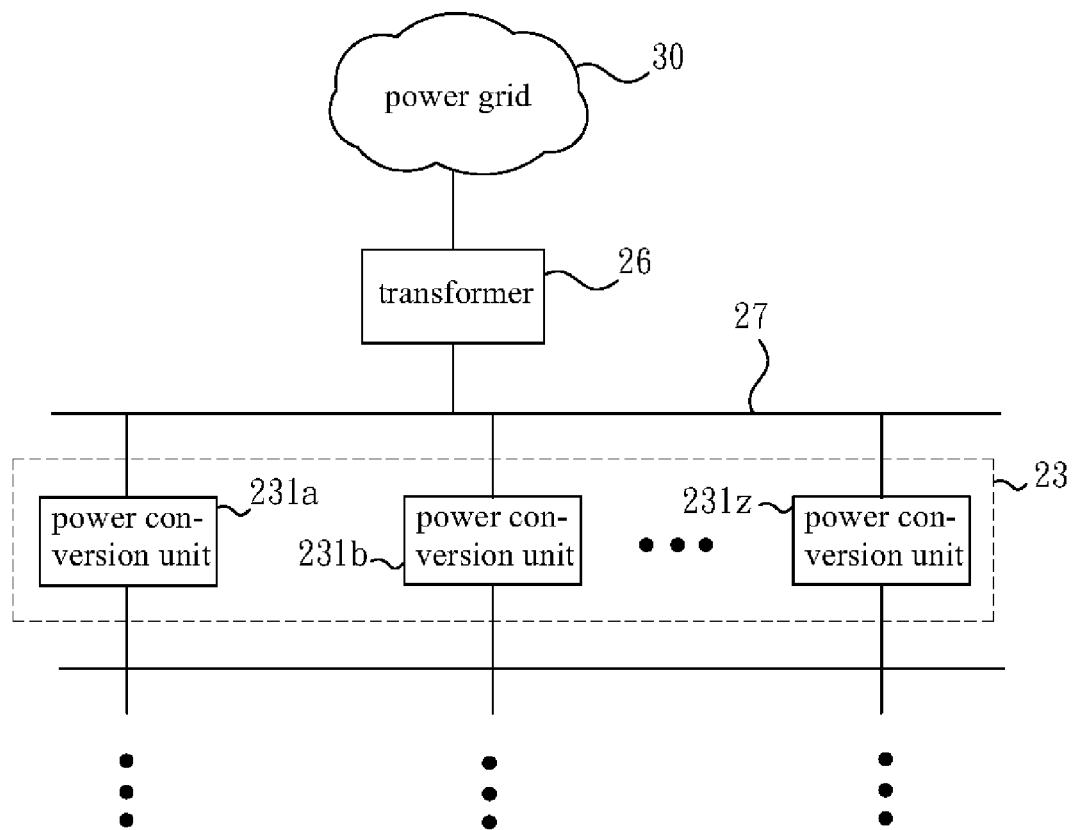

In addition, please refer to FIGS. 5A and 5B, the voltage level of the power dispatching station is different from the voltage level of the power grid 30, which means that the voltage of the power grid may be much higher than the voltage of the power dispatching station. Therefore, a transformer 26 needs to be connected in series between the power grid 30 and the AC/DC power conversion device 23 for voltage matching. The connection between the AC/DC power conversion device 23 and the transformer 26 can be as shown in FIG. 5A. Each power conversion unit 231a-231z is directly connected in series to the corresponding transformer 261a-261z, and then connected to the power grid 30. The connection between the AC/DC power conversion device 23 and the transformer 26 can also be shown in FIG. 5B. Each power conversion unit 231a~231z is connected in parallel to an AC bus 27, and then connected to the power grid 30 through the transformer 26.

The architecture of the existing battery energy storage power station is to electrically connect multiple battery strings to the DC bus. However, the DC bus is essentially the same as the battery string, and both are standard voltage sources. Therefore, the voltage of the DC bus is the voltage of the battery string, which is unnecessary and cannot be controlled.

The architecture of the electric power dispatching system 20 is to electrically connect the multiple swappable battery packs 21 to the DC bus 25, and the swappable battery pack 21 is constitute of the battery cells 212 and the DC power converter 211, which are electrically connected to each other. The DC power converter 211 is essentially connected to the DC bus 25 in parallel. Therefore, the DC power converter 211 of each swappable battery pack 21 must be controlled by the energy control center 24 to ensure the stability of parallel operation and maintain the voltage of the DC bus 25 (including the sub-bus) is within the predetermined range. In other words, one of the technical features of the present invention also includes that the energy control center 24 controls the AC/DC power conversion device 23 and the DC power converter 211 to control the voltage of the DC bus 25 being within the predetermined range.

Please refer to FIG. 3 again, the energy control center 24 can also designate (or control) parts of the swappable battery packs 21, which are located in the accommodating space 22, to participate in the first power dispatch task according to the first power demand instruction 101 so that the swappable battery pack 21 provide power to the power grid 30 through the DC bus 25 and the AC/DC power conversion device 23, or consume the power provided by the power grid 30. Among them, one energy control center 24 can communicate with one power dispatching station, or it can communicate with multiple power dispatching stations at the same time to achieve better dispatching capabilities.

The so-called "first power demand instruction 101" can be an instruction transmitted from the power grid or can be actively generated by the energy control center 24 in response to real-time power load conditions. The energy control center 24 can dispatch the power of the power dispatching station according to the first power demand instruction 101 to generate electricity to power grid 30 or consume the power provided by the power grid 30.

The power dispatching station has three functions: battery swapping of the electric vehicle 100, the load shifting of the power grid 30, and battery energy storage power generation. On holidays, the power dispatching station uses the battery swapping of the electric vehicle 100 as its main function, and on non-annual holidays, the power dispatching station uses the load shifting operation of the power grid 30 and battery energy storage power generation operations as its main function. The reason is that there are a large number of the electric vehicle 100 driving on the road during the holiday, so the power dispatching station needs to reserve a large amount of the swappable battery pack 21 for the replacement of the electric vehicle 100, and during the holiday, the peak power demand of the power grid 30 is greatly reduced, so supply and demand can match each other. In addition, during non-holidays, there are a large number of the electric vehicle 100 at rest or short-distance movement, so most of the swappable battery pack 21 can be left in the power dispatching station as the load shifting operation of the power grid 30 and battery energy storage power generation operations. The swappable battery pack 21 used for battery swapping must be fully charged, while the swappable battery pack 21 used for the load shifting of the power grid 30 and battery energy storage power generation may not necessarily have to be fully charged. Battery swapping can only be performed by the power dispatching station, so battery swapping operations have a higher priority in the power dispatching station.

The reserve capacity is the capacity that is the total capacity of all swappable battery packs 21 stored in the power dispatching station, it minus the expected number and the capacity of battery swapping is the maximum power generation capacity. In general, the reserve capacity is greater than the maximum power generation capacity.

The swappable battery pack 21, which is centrally stored in the power dispatching station, can be within three states, namely, charging state, discharging state, and standby state. If the swappable battery within the standby state is fully charged, it can be used for battery swapping or power generation, and if the swappable battery within the standby state is not fully charged, it can be used for power generation preparation, or used for battery swapping or power generation after fully charged.

The battery capacity of the existing battery energy storage power station is fixed, that is, the reserve capacity is fixed. Since the swappable battery pack 21, which is centrally stored in the power dispatching station, will change the quantity according to the demand of the electric vehicle, one of the technical features of the present invention also includes that the reserve capacity in the power dispatching station is variable.

Figure 6:
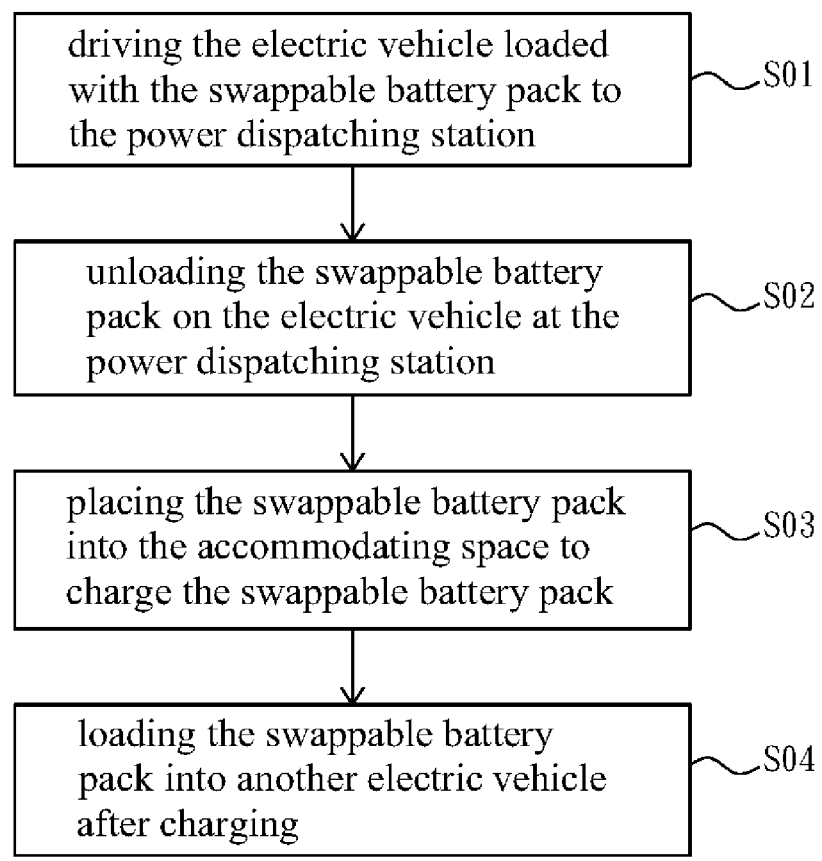
FIG. 6 is a flowchart of centralizing the swappable battery pack to the power dispatching station in a preferred embodiment of the present invention.

Then, please refer to the above description, and then use an embodiment to illustrate the electric power dispatching method of the present invention. Please refer to FIG. 6, which shows a flow chart of storing multiple swappable battery packs 21 into the power dispatching station, which includes steps S01 to S04. First, in step S01, the electric vehicle 100 loaded with the swappable battery pack 21 is driven to the power dispatching station.

Step S02 is to unload (or called uninstall) the swappable battery pack 21 on the electric vehicle 100 at the power dispatching station. The electric vehicle 100 can drive to a specific area or space, and unload the swappable battery pack 21 from the electric vehicle 100 through a robotic arm or other automated equipment. Among them, the robotic arm can be a four-axis or six-axis robotic arm, which is not limited. In addition, the robotic arm can also be equipped with manpower to assist in the uninstallation of the swappable battery pack 21.

Step S03 is to place the swappable battery pack 21 that has been unloaded into the accommodating space of the swappable battery pack in the power dispatching station to prepare for subsequent charging of the swappable battery pack 21. The unloaded swappable battery pack 21 can be moved to the corresponding accommodating space 22 through an automatic guided vehicle (AGV) or conveying device, and placed in the accommodating space 22 to connect to the corresponding connector. Step S03 may also include unlocking the swappable battery pack 21 that has been locked, so that the bidirectional DC power converter 211 in the swappable battery pack 21 enables the charging direction of the battery, so that power can pass through the DC bus 25 and the DC power converter 211 and charge the swappable battery pack 21.

Step S04 is to load the swappable battery pack 21 into another electric vehicle 100 after charging. When another electric vehicle 100 drives to the power dispatching station and needs to load or replace the swappable battery pack 21, the power dispatching station can lock the swappable battery pack 21 that needs to be locked, and then the fully charged swappable battery pack 21 is loaded into the electric vehicle 100 on demand by the robotic arm or other automated equipment.

Through the above steps, the swappable battery pack 21 can be moved between the different power dispatching station and the electric vehicle through the electric vehicle 100, and the power dispatching station can be used as a centralized storage base. Certainly, the power dispatching station can also store the swappable battery pack 21 that is retired and no longer moving. It is to be noted, due to the swappable battery pack 21 has the advantages of shape compatibility, the same connector, the same control firmware, etc., the retired swappable battery pack 21 can also be used directly at the power dispatching station to increase the value of the swappable battery pack 21, which has been retired and to reduce costs. Since the swappable battery pack 21 adopts the same appearance and connection interface, with the advancement of technology, even if the internal capacity of the battery cells 212 increases or the efficiency of the DC power converter 211 increases, it can still be shared for use. Similarly, the accommodating space 12 of the swappable battery pack can also be maintained in common use. Therefore, one of the technical features of the present invention also includes that the swappable battery pack in use and the retired swappable battery pack share the same accommodating space 12 of the swappable battery pack. It should be noted that the so-called "the retired swappable battery pack", in the industry, is defined by the actual capacity drops to 80% of the marked capacity, the battery will be retired.

Figure 7:
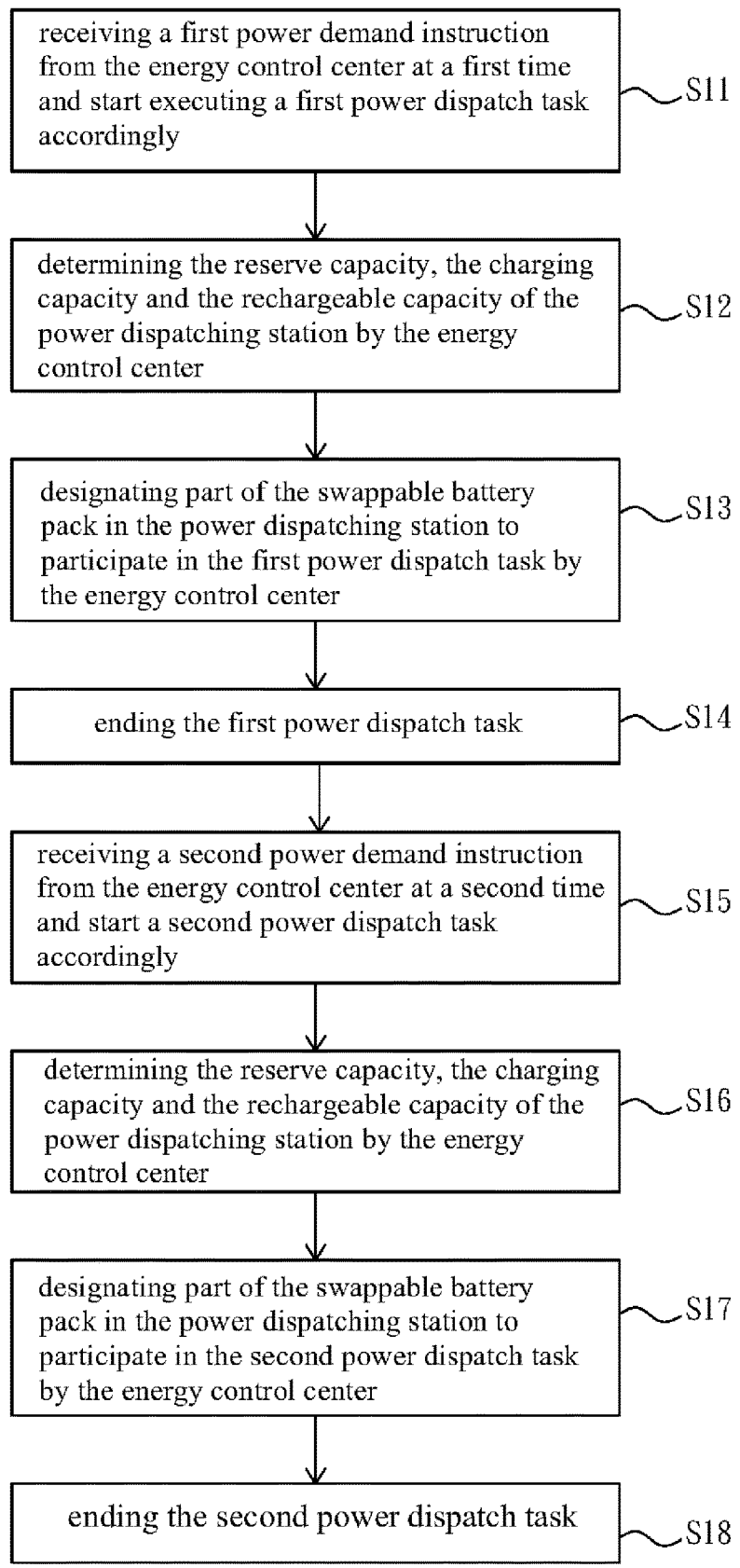
FIG. 7 is a flowchart of the electric power dispatching method according to a preferred embodiment of the present invention.

Please refer to FIG. 7, which shows the flow chart of the electric power dispatching method. When the power company finds that the supply and demand of the power are unbalanced, it can issue the power demand command according to the real-time power situation to seek assistance from the electric power dispatching system, which may include the following steps.

Step S11 is to receive a first power demand instruction 101 from the energy control center 24 at a first time and start executing a first power dispatch task accordingly.

In step S12, the energy control center 24 determines or analyzes the reserve capacity, the charging capacity and the rechargeable capacity of the power dispatching station. The energy control center 24 can obtain parameter information of the swappable battery pack 21 by communicating with the swappable battery pack 21 set in the accommodating space 22 and perform optimization calculations after obtaining all the information. Among them, the parameter information includes, but is not limited to, the real-time total power of all the swappable battery packs, or the power of the individual swappable battery pack.

In step S13, the energy control center 24 designates part of the swappable battery pack 21 in the power dispatching station to participate in the first power dispatch task. In the normal operation mode, the power dispatching station will keep part of the swappable battery pack 21 based on the battery swap history record for the replacement of other electric vehicles. Therefore, according to the aforementioned optimization calculation, only part of the swappable battery pack 231 will participate in the first power dispatch task.

To further illustrate, suppose that the power grid 30 has a power demand of 100 KW in the first power demand instruction 101. At this time, the energy control center 24 can take at least the following two methods to execute the power dispatch task after obtaining a power capacity information of the power dispatching station. The first method is to discharge the designated swappable battery pack 21, so that it can provide 100 KW of power to the power grid 30 through the AC/DC power conversion device 23. The second method is to reduce the charging power of 100 KW by the designated swappable battery pack 21 to increase the power of the power grid 30 by 100 KW. Of course, the two methods can also be mixed to provide the power required by the power grid 30.

In addition, regarding the designation of the swappable battery pack 21 to participate in the power dispatch task, the term "designation" can be performed in different ways in addition to the direct designation mentioned above. Take the power generation dispatch task as an example that is to divide the accommodating spaces 22 into multiple groups, and then place the swappable battery pack 21 in the accommodating space 22 of the corresponding group according to the designated content, and finally is to generate power in turn by power control by each group in accordance with the instructions. In short, the term "designated" in addition to designating the number of the swappable battery pack to perform power generation can also designate the power output by the swappable battery pack. In addition to generating power in turn by each group, can also designate the swappable battery packs 21 in the accommodating space 22 in one of the groups to generate power in turn by power control according to a pre-designated order.

Step S14 is to end the first power dispatch task. If the first power dispatch task is the power generation dispatch task, after the task demand is dismissed, the electric power dispatching system 20 can perform the peak reduction operation of the power grid 30 and continue to assist the power grid 30 to stabilize.

Step S15 is to receive a second power demand instruction from the energy control center 24 at a second time and start a second power dispatch task accordingly. Step S16 is the same as step S12, in which the energy control center 24 determines or analyzes the reserve capacity, charging capacity and rechargeable capacity of the power dispatching station. Step S17 is similar to step S13, in which the energy control center 24 designates part of the swappable battery pack 21 in the power dispatching station to participate in the second power dispatch task. Step S18 is similar to step S14, ending the second power dispatch task.

It should be noted that because the swappable battery pack 21 in the power dispatching station can be circulated between the electric vehicles 100 and other power dispatching stations, so the swappable battery packs 21 participate in the first power dispatch task and the second power dispatch task mentioned above may be different. The so-called "different" means that the number of the swappable battery pack 21 participating in the power dispatch task is different, the location of the accommodating space 22 is different, or the main body of the swappable battery pack 21 is different. For example, the battery cell 212 of the swappable battery pack 21 has different voltages, or the swappable battery pack 21 has different output currents, which are all referred to as "different" in the specification.

During the execution of the power dispatch task, if the power grid 30 temporarily increases demand, the power dispatching station can designate other swappable battery pack 21 to participate in the power dispatch task during the power generation process. Since every swappable battery pack 21 has the DC power converter 211, therefore the swappable battery pack 21 can directly exit or participate in the power dispatch task during the process of the power dispatch task. In other words, the number of the swappable battery pack 21 participating in the power dispatch task can be increased or decreased during the process of the power dispatch task. However, compared with the existing battery energy storage power generation, the battery cell is directly connected to the DC bus, and the voltage of a single battery cell is different from the DC bus, so the battery cell cannot be directly connected to the DC bus during the power generation process. Therefore, one of the technical features of the present invention also includes during the process of the power dispatch task, when the power demand of the power grid 30 increases or the power demand time lengthens, the quantity of the swappable battery pack 21 for grid-connected power generation can be increased in a timely manner to support the change in demand of the power grid 30.

From the perspective of the swappable battery pack, one of the main technical features of the present invention also includes a swappable battery pack that executes different power dispatch tasks in different power dispatching stations. Since the swappable battery pack in the accommodating space of the power dispatching station is electrically connected to the DC bus, in the process of power dispatching in the same power dispatching station, part of the swappable battery may be in a charged state through the DC bus, and part of the swappable battery pack may be in a discharged state through the DC bus. At the same time, if the amount of the swappable battery pack 21 used for replacement is insufficient, a part of the swappable battery pack can be charged by the swappable battery pack, which is participated in the power generation task, through the DC bus. Therefore, the power of the swappable battery pack concentrated in the power dispatching station can be optimized to cope with the swappable battery pack replacement operation of the electric vehicle that may increase suddenly.

For example, each power dispatching station prepares sufficient and fully charged swappable battery pack 21 for battery replacement according to historical records, and monitors highway traffic information at the same time. When the amount of the swappable battery pack 21 used for replacement is insufficient when the traffic in the highway traffic information increases, the swappable battery pack 21 with higher power can be charged for subsequent replacement operation. Even when the power dispatching station is performing power generation tasks, the battery can still be charged at any time, and the number of the swappable battery pack 21 for replacement can be increased flexibly.

Furthermore, since the swappable battery pack 21 is connected to the power grid 30 through the DC bus 25 and the AC/DC power conversion device 23. Therefore, for the swappable battery pack 21, the power grid 30 can control the power dispatching station through the energy control center 24 to perform power consumption operations or grid-connected power generation operations. Accordingly, efficient power dispatch can be done through the electric power dispatching system 20 of the present invention.

In summary, an electric power dispatching system and its dispatching method of the present invention is to integrate the swappable battery pack used by the electric vehicle and adaptively dispatch and use it to effectively integrate the increasing amount of the swappable battery pack of the electric vehicle. Furthermore, the swappable battery pack can quickly provide grid-connected power generation when the power grid needs backup power. In addition, the present invention can adaptively dispatch the number of the swappable battery pack in response to changes of the power load, and can increase or decrease the number of the swappable battery pack in a timely manner during the grid-connected power generation process, due to the structure of the electric power dispatching system matches the swappable battery pack with the DC power converter. Accordingly, the power demand of the power grid and the demand of the electric vehicle to replace the swappable battery pack will be able to provide the most appropriate scheduling operations, and the charging demand of the electric vehicle will change from the burden to the boost of the power grid.

The above embodiments merely give the detailed technical contents of the present invention and inventive features thereof and are not to limit the covered range of the present invention. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An electric power dispatching method applied to a power dispatching station, wherein the power dispatching station has a plurality of accommodating spaces, a DC bus, and an AC/DC power conversion device, each accommodating space corresponds to a connector, at least some of the connectors are coupled in parallel to the DC bus, and the AC/DC power conversion device is coupled between the DC bus and a power grid, comprising:
centrally storing a plurality of swappable battery packs, which is unloaded from different electric vehicles, in the corresponding accommodating space, and the connector corresponding to the accommodating space is electrically connected to the swappable battery pack stored in the accommodating space, wherein each of the swappable battery packs has a DC power converter and a plurality of battery cells; and
controlling the AC/DC power conversion device and the DC power converter of each swappable battery pack located in each accommodating space by an energy control center to designate a part of the swappable battery packs located in the accommodating spaces to participate in a first power dispatch task,
wherein the first power dispatch task includes providing power to the power grid through the DC bus and the AC/DC power conversion device by the designated swappable battery packs.

2. The electric power dispatching method of claim 1, wherein at least one of the swappable battery packs is charged from the DC bus and at least one of the swappable battery packs is discharging to the DC bus at the same time.

3. The electric power dispatching method of claim 1, wherein the energy control center further executes a second power dispatch task to designate the swappable battery packs different from the first power dispatch task to participate in the second power dispatch task.

4. The electric power dispatching method of claim 1, wherein the energy control center further executes a second power dispatch task, in which part of the swappable battery packs participate in the first power dispatch task and the second power dispatch task is located in the different accommodating spaces.

5. The electric power dispatching method of claim 1, wherein the number of the swappable battery packs joining with the first power dispatch task is different during the first power dispatch task.

6. The electric power dispatching method of claim 1, wherein the first power dispatch task includes a first power generation dispatch task and a first power consumption dispatch task.

7. The electric power dispatching method of claim 6, wherein the total current flowing from the swappable battery packs to the DC bus is increased during the first power generation dispatch task.

8. The electric power dispatching method of claim 6, wherein the total current flowing from the DC bus to the swappable battery packs is increased during the first power consumption dispatch task.

9. The electric power dispatching method of claim 1, wherein the energy control center is to control the DC bus voltage within a predetermined range.

10. The electric power dispatching method of claim 1, wherein part of the swappable battery packs that participated in the first power dispatch task also participated in a power dispatch task of another power dispatching station.

11. An electric power dispatching system is cooperated with a power dispatching station, which centrally stores a plurality of swappable battery packs unloaded from different electric vehicles by an exchanging device, and each of the swappable battery packs has a DC power converter and a plurality of battery cells, which are electrically connected to each other, and part of the swappable battery packs have the same appearance and different capacity, comprising:
  a plurality of accommodating spaces, which respectively accommodate the corresponding swappable battery pack, and each accommodating space being provided with a connector, which being contacted to the corresponding swappable battery pack and at least some of the connectors being coupled in parallel to a DC bus;
  an AC/DC power conversion device, which being coupled between the DC bus and a power grid; and
  an energy control center, which controls the AC/DC power conversion device and the DC power converter of each swappable battery pack accommodated in each accommodating space, and designates a part of the swappable battery pack accommodated in the accommodating space to participate in a first power dispatch task,
  wherein the first power dispatch task includes providing power to the power grid by the designated swappable battery packs through the DC bus and the AC/DC power conversion device.

12. The electric power dispatching system of claim 11, wherein the energy control center controls the AC/DC power conversion device and the DC power converter inside the swappable battery to control the DC bus voltage within a predetermined range.

13. The electric power dispatching system of claim 11, wherein the DC power converter of each swappable battery pack is a non-isolated DC power converter.

14. The electric power dispatching system of claim 11, wherein the voltage of the DC bus is higher than the voltage of the battery cells inside the swappable battery pack.

15. The electric power dispatching system of claim 11, wherein the AC/DC power conversion device includes a plurality of power conversion units selected from a DC to AC conversion unit, an AC to DC conversion unit, and combinations thereof.

16. The electric power dispatching system of claim 11, wherein the DC power converter of the swappable battery pack is a bidirectional DC power converter.

17. The electric power dispatching system of claim 11, wherein the AC/DC power conversion device is connected to the power grid through a transformer.

\* \* \* \* \*